United States Patent [19]
Lichfield

[11] Patent Number: 5,938,372
[45] Date of Patent: Aug. 17, 1999

[54] SUBSURFACE IRRIGATION APPARATUS AND METHOD

[76] Inventor: William H. Lichfield, 4090 W. 2600 North, P.O. Box 112, Corinne, Utah 84307

[21] Appl. No.: 08/811,945

[22] Filed: Mar. 5, 1997

[51] Int. Cl.$^6$ ............................ A01G 25/06; A01G 25/16
[52] U.S. Cl. ................................. 405/38; 405/36; 405/37; 405/39; 405/43; 405/50
[58] Field of Search ................................. 405/36–39, 40, 405/43, 50

[56] References Cited

U.S. PATENT DOCUMENTS

| | | | |
|---|---|---|---|
| 3,479,825 | 11/1969 | Hellstrom | 405/38 |
| 3,908,385 | 9/1975 | Daniel et al. | 405/37 |
| 4,832,526 | 5/1989 | Funkhouser, Jr. | 405/43 |
| 4,881,846 | 11/1989 | Burkstaller | 405/37 |
| 5,064,308 | 11/1991 | Almond et al. | 405/43 |
| 5,306,317 | 4/1994 | Yoshizaki | 405/36 X |

Primary Examiner—Tamara Graysay
Assistant Examiner—Tara L. Mayo
Attorney, Agent, or Firm—J Winslow Young

[57] ABSTRACT

A subsurface irrigation apparatus and method, the apparatus including an underlayment of water resistant material which also serves as a mounting surface for the remaining elements of the subsurface irrigation apparatus. Water is supplied to the subsurface irrigation apparatus through a water supply conduit and distributed through a plurality of water distribution conduits. Each water distribution conduit includes a plurality of spaced holes through which the irrigation water distributed by the water distribution conduits. A diffuser is mounted across each hole to diffuse the water into the surrounding soil. Each diffuser includes a layer of fibrous material partially covered by a water resistant overlayment. The fibrous layer diffuses the water outwardly from the hole while simultaneously inhibiting root encroachment into the hole. A layer of coarse sand may be overlayed across said subsurface irrigation apparatus for helping diffuse the water into the soil, particularly those soils having a high content of clay. A valve and a controller to control the valve are also included. A moisture sensor can also be used to sense the moisture level in the soil to activate the controller.

19 Claims, 2 Drawing Sheets

SUBSURFACE IRRIGATION APPARATUS AND METHOD

BACKGROUND

1. Field of the Invention

This invention relates to subsurface irrigation systems, and more particularly, to a subsurface water irrigation apparatus and method, the irrigation apparatus including a unique diffuser system for uniformly distributing the water while simultaneously inhibiting root infiltration into the water distribution apparatus.

2. The Prior Art

Subsurface watering systems are known in the art and incorporate various devices for distributing the water. A primary reason for using a subsurface watering system is that it provides substantial savings in the quantity of water used. Pumping costs are also less in the event a pump is required as compared to the pumping costs incurred when pumping is necessary to supply sufficient pressure in order to operate a conventional sprinkling system. The conventional sprinkling system for lawn and landscape irrigation is usually permanently installed and involves a network of underground pipes to supply the irrigation water to above-ground sprinkler heads spaced throughout the area to be watered. A series of valves control selected portions of the irrigation network and can be either manually controlled or operated by timer devices. Although such a permanent sprinkler system is much more convenient than a manually positioned sprinkler system there are a number of problems associated with these types of sprinkler system.

Water consumption is perhaps the most serious problem since a very high percentage of the sprinkled water is lost to evaporation, particularly during hot, windy weather conditions. Further many sprinkler systems deliver the water at a rate that exceeds the ability of the soil to absorb the water with the result that there is excessive runoff and/or the creation of swampy areas. Both of these conditions contribute to significant water wastage. Additionally, sprinkler systems are always designed so that the spray from each sprinkler head overlaps the spray from adjacent sprinkler heads. Conventionally, this overlap is in the range of about 60% which further exacerbates the runoff problem.

Another problem with conventional sprinkler systems results from overspray that strikes automobiles, buildings, windows, and the like, particularly on windy days. This problem is particularly acute in arid regions of the country since the water in these regions generally contains relatively high concentrations of dissolved salts such as calcium carbonate. The result is that these salts are deposited on the adjacent surfaces where it creates an unsightly deposit when the water evaporates. It is a common sight in these regions to see bricks, windows, automobiles, and the like stained by these unsightly deposits.

Above-ground sprinkler systems also restrict usage of the lawn area watered thereby both during watering and for a period of time thereafter until the grass has become sufficiently dry. Accordingly, it is customary to water golf courses, for example, at night so that the grass will be sufficiently dry for play the next morning. However, this practice exacerbates another problem in that it makes the grass more susceptible to attack by fungi such as mold, moss, etc.

Another problem with above-ground sprinkler systems is that the sprinklers themselves are easily damaged by lawn care equipment, golf carts, etc. A further problem is that many injuries are caused by inadvertent contact with the sprinkler during play or merely by accidently tripping over them.

In the area of water conservation, it is neither practicable nor economically feasible to use what is euphemistically referred to as "grey water" in an above-ground sprinkling system. This arises from the aesthetics of using grey water due to sanitation, odors, etc., plus the added expense of the necessary pumping systems to develop sufficient pressure to render the grey water sprinkler system operable.

Various underground irrigation systems are known in the art. As the name implies, these systems are designed to deliver the water to distribution outlets spaced at intervals along the underground tubing. One patent, for example, (U.S. Pat. No. 3,479,825; Hellstrom) discloses a subsurface irrigational system wherein an artificial barrier is buried a substantial distance below the surface of the soil in order to create an artificial water table below the roots of the crops growing in the soil. Water is introduced into the soil through buried pipes or through deep ditches in order to cause the water to migrate laterally throughout the soil. The barrier prevents the water from disappearing into the earth.

Reese (U.S. Pat. No. 4,060,991) discloses a subsurface irrigation system for plants specifically designed to eliminate problem of roots fouling the water distribution system. An underground, vented chamber includes a float valve mechanism to regulate the quantity of water in the chamber. A pipe carries water from the chamber to a moisture pit. Both the pipe and the moisture pit are filled with sand to provide a capillary path for the water while serving as a root barrier.

Brandt (U.S. Pat. No. 4,065,926) discloses a subterranean irrigation system wherein a coarse screen or grid of flexible material having internal interconnecting passages for the flow of water. The grid is buried underneath the area to be watered. Orifices are distributed along the interconnecting passages to release the water by gravity feed from a source or reservoir.

Funkhouser, Jr. (U.S. Pat. No. 4,832,526) discloses an underground watering system wherein a plurality of equally spaced, shallow water reservoir trenches are prepared. The trenches are formed with rounded surfaces and are lined with a waterproof liner. a water distribution pipe is laid in each trench and the trenches are filled with a fine stone aggregate. A water permeable fabric is placed across the entire area to be watered. A relatively course layer of aggregate is placed over the water permeable fabric followed by an upper layer of relatively fine aggregate. A sod layer is then placed on top of the fine aggregate where its roots receive moisture drawn up through the various layers by capillary action.

U.S. Pat. No. 5,374,138 teaches a lawn area subsurface irrigation system wherein special conduits spaced at predetermined intervals deliver the water into the soil at the root level. A deflector system is included as part of the conduit to block the downward movement of water in the deflecting area below the conduit.

Each of these prior art references are directed to solving problems associated with above-ground sprinkling systems and subsurface irrigation systems. However, unless the subsurface irrigation system is provided will very elaborate and, therefore, costly shielding systems such as those taught by Reese (U.S. Pat. No. 4,060,991) or Funkhouser, Jr. (U.S. Pat. No. 4,832,526) the orifices by which the water is released into the soil will be highly susceptible to encroachment by roots from the plant. That roots will seek out a source of water and, indeed, grow into the source of water to such an extent as to eventually plug the water conduit is a well known fact. For example, an entire service industry has been created around this phenomena in the area of rotary derooting of sewer lines. Subsurface lawn irrigation systems will clearly encounter the same phenomena although on a smaller scale but with the same consequences, namely, plugged orifices.

It would, therefore, be a significant advancement in the art to provide a subsurface irrigation apparatus having a plurality of water distribution lines each having a plurality of orifices therein for the uniform delivery of water, each orifice being shielded from root encroachment by a unique water diffusion device. It would also be an advancement in the art to mount the conduits and the diffusion devices to a water impervious membrane for ease of fabrication and installation of the subsurface irrigation apparatus. Such a novel apparatus and method is disclosed and claimed herein.

BRIEF SUMMARY AND OBJECTS OF THE INVENTION

This invention is a novel subsurface irrigation apparatus and method wherein a plurality of water distribution conduits are bonded to a water-impervious membrane in a preselected spacing. Each conduit includes a plurality of orifices formed at spaced locations along the length of each conduit. A diffuser is mounted atop each orifice and is prepared from a swatch of fibrous material over which a smaller swatch of water-impervious material is laid as an outer covering. The outer covering is dimensionally smaller than the swatch of fibrous material so as to leave a peripheral border of fibrous material which border serves as the diffusing mechanism for diffusing water into the overlying soil. Importantly, the fibrous material inhibits root encroachment into the orifice in the tubing. A layer of course sand or gravel can also be placed atop the subsurface irrigation apparatus to assist in diffusing the water into the overlaying soil. A moisture sensor coupled into a timer/controller assists in more precisely delivering water into the soil. A filter is also included for those applications where the water is either unfiltered secondary water or grey water.

It is, therefore, a primary object of this invention to provide improvements in subsurface irrigation apparatus.

It is another object of this invention to provide improvements in the method of delivering water to plants at a subsurface location.

Another object of this invention is to provide a subsurface irrigation apparatus wherein the water distribution conduits are bonded in a spaced array to a sheet of water impervious membrane for ease of fabrication, handling, and installation.

Another object of this invention is to provide a plurality of spaced orifices in each conduit.

Another object of this invention is to provide a diffuser for each orifice.

Another object of this invention is to provide a diffuser that is fabricated from a swatch of fibrous material having a water-impervious layer as an overlayment.

Another object of this invention is to provide a peripheral border of fibrous material extending beyond the perimeter of the overlayment to increase the surface area of the fibrous material exposed to the soil.

Another object of this invention is to provide a layer of coarse sand or gravel atop the subsurface irrigation apparatus to aid in diffusing the water into the root zone of the plants.

Another object of this invention is to provide a controller for automatically controlling the delivery of water to the subsurface irrigation apparatus.

Another object of this invention is to provide a moisture sensor for sensing low moisture conditions for the plants being watered by the subsurface irrigation apparatus.

Another object of this invention is to provide a filter for the inlet to the subsurface irrigation apparatus for removing foreign objects from the incoming water particularly when grey water is being used.

Another object of this invention is to selectively provide a plurality of spaced drain holes in the water impervious membrane.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
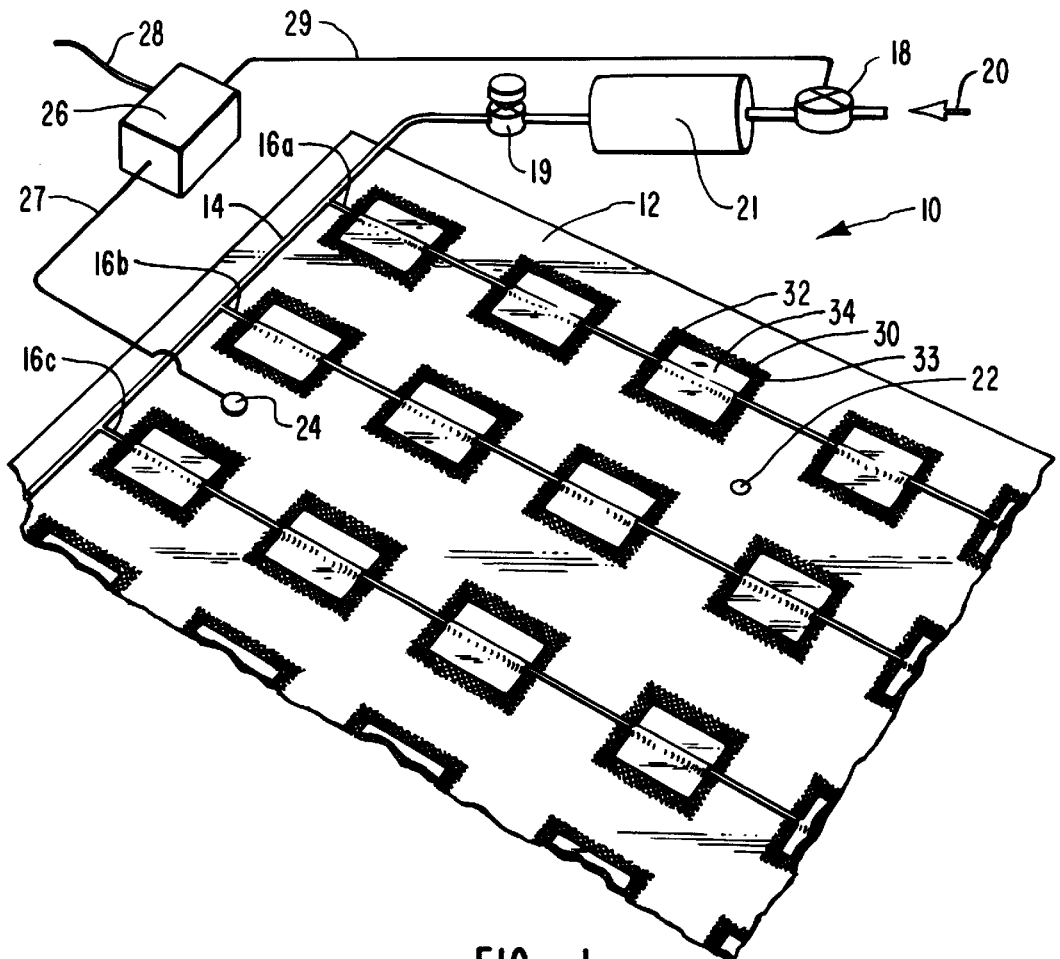
FIG. 1 is a perspective view of the novel subsurface irrigation apparatus of this invention.

The invention is best understood from the following description with reference to the drawing wherein like parts are designated by like numerals throughout and taken in conjunction with the appended claims.

General Discussion

The novel, subsurface irrigation apparatus and method of this invention involves an underlayment to which a plurality of irrigation conduits are bonded. Water outlets are provided in the irrigation conduits at spaced intervals. Importantly, I have provided each water outlet with a water diffuser that not only diffuses water uniformly into the region about each water outlet but also prevents root encroachment into the irrigation conduits through the water outlet. Each water diffuser is configured as a swatch of fibrous material such as a nonwoven mat of fiberglass strands through which the water is readily able to percolate. A smaller swatch of plastic is placed atop the fibrous layer as an overlayment and to shield a major portion of the fibrous layer against soil encroachment into the fibrous layer. The dimensions of the plastic overlayment are incrementally less than the dimensions of the fibrous layer to provide a peripheral fringe through which the water is diffused into the surrounding soil. Importantly, the size of the individual diffusers and their spatial relationship is selectively predetermined in order to obtain the optimal delivery of irrigation water. This not only saves water but also minimizes the creation of soggy zones and/or dry zones. A layer of course sand or gravel can also be placed over the subsurface irrigation apparatus to assist in water diffusion particularly in areas where the soil includes a high clay content.

A further advantage provided by my unique subsurface irrigation apparatus is that it lends itself admirably to usage on sloped surfaces to provide a uniform distribution to the overlying soil. Sloped surfaces are especially difficult to water due to excessive runoff. However, I have found that I can selectively adjust the placement of the holes in the distribution conduits along with the size of the various holes and thereby achieve uniform water distribution into the soil. Hole placement usually entails creating an offset or staggered pattern with the holes to accommodate for the fact that each hole will distribute water in a plume that generally fans outwardly in the downslope direction from the hole. The staggered pattern will preclude excessive overlap between succeeding plumes. The size of holes in the distribution conduits will also accommodate for this fact of the downwardly oriented plumes by having smaller holes downslope so that less water is delivered to the soil to compensate for the overlaying plume. Importantly, my novel subsurface irrigation apparatus thereby essentially eliminates water runoff on sloped surfaces, especially steeply sloped surfaces.

Drainage holes are selectively located at spaced intervals in the underlayment in order to preclude the buildup of salts from the irrigation water. These drainage holes allow excess water to drain away from the underlayment and carry away residual salts left behind upon evaporation and transpiration of the irrigation water from the soil. The number and placement of the drainage holes is predetermined based upon the requirements of the specific application. If additional holes are required after the sod has developed atop the subsurface irrigation apparatus they can be punched using a sharpened spike. An optional controller can be included in the system to provide for watering on a predetermined cycle. Further, a moisture sensor can also be included as a means for activating the controller when the soil moisture drops below a preset amount. Advantageously, my novel subsurface irrigation apparatus can be activated at any time regardless of the activity taking place on the sod.

Detailed Description

Referring now to FIG. 1, the novel subsurface irrigation apparatus of this invention is shown generally at 10 and includes an underlayment 12 having a supply conduit 14 and a plurality of irrigation, or rather, distribution conduits 16a–16c bonded thereto. Distribution conduits 16a–16c are coupled in fluid communication to supply conduit 14. A valve 18 in supply conduit 14 regulates the delivery of water (shown schematically herein at arrow 20) to supply conduit 14. Supply conduit 14 also includes a filter 21 and a pressure regulator 19 therein. Filter 21 is necessary for those applications where water 20 is obtained from a source of secondary water such as irrigation water, grey water, or the like. Pressure regulator 19 selectively reduces the pressure of water 20 prior to water 20 being introduced into distribution conduits 16a–16c.

Figure 2:
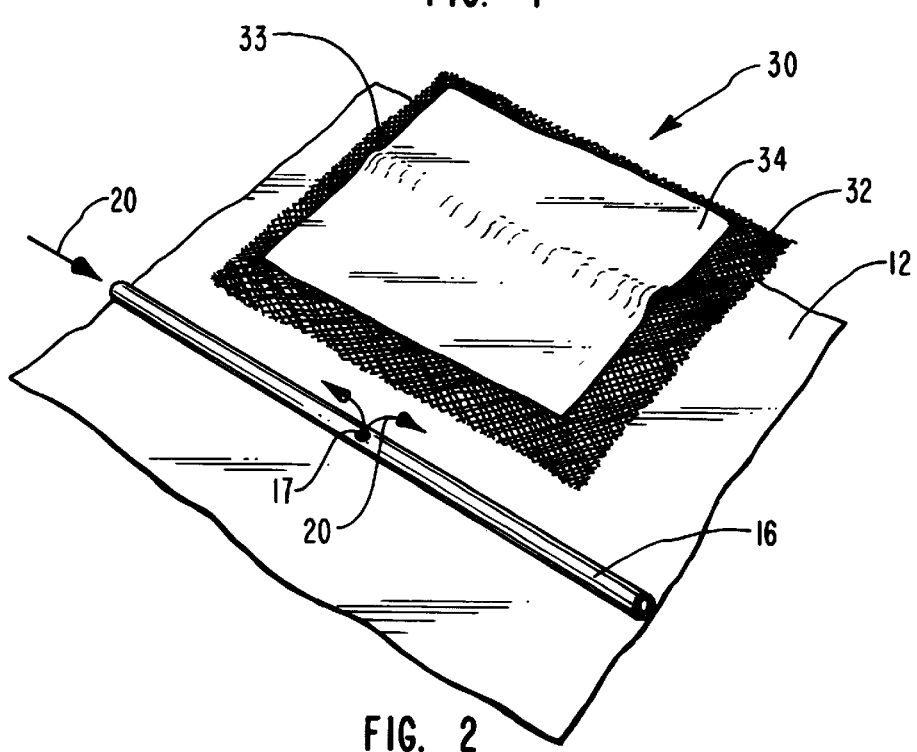
FIG. 2 is a fragmentary, exploded perspective view of the novel diffuser for my subsurface irrigation apparatus.

Referring now also to FIG. 2, each of distribution conduits 16a–16c has a plurality of diffusers 30 mounted thereto at spaced intervals along the length thereof. Diffuser 30 is configured as a diffusion layer 32 over which is laid an overlayment 34. Diffusion layer 32 is fabricated from a fibrous layer through which water 20 can easily pass. I have found that a relatively thin (about one to, say, five millimeters) layer of diffusion layer 32 provides an adequate flow zone for the uniform diffusion of water 20. Preferably, diffusion layer 32 is prepared from a nonwoven mat of an inert material such as glass fibers which are completely impervious to degradation from mildew, dissolution, rot, or the like. Further, it appears that the random placement of the glass fibers in diffusion layer 32 inhibits root encroachment into diffusion layer 32 apparently because there are no regular flow paths for water that would otherwise be found in a woven layer. Further, a nonwoven mat is substantially less expensive to produce than a woven mat. Importantly, diffusion layer 32 is dimensionally configured to extend beyond the outer periphery of overlayment 34 to provide a peripheral fringe 33. Fringe 33 serves as the interface zone for the diffusion of water 20 into the adjacent soil. This feature provides for an increased surface area through which water 20 is diffused into the soil thereby providing a more uniform distribution of water 20.

Underlayment 12 is prepared from either a water resistant or, preferably, from a water-impervious material such as a plastic, or the like. All of the elements of supply conduit 14, distribution conduits 16a–16c and diffusers 30 are adhesively or thermally bonded to overlayment 12 so as to accommodate subsurface irrigation apparatus 10 being rolled into a roll for ease of shipping, handling, and installation. Underlayment 12 is fabricated from a plastic sheet material that is suitably robust in order to withstand both handling abuse as well as to support the water diffusion system mounted thereto and to withstand deterioration over time as it is intended for permanent installation in the soil. Underlayment 12 may also be selectively modified to include a plurality of drain holes 22 at spaced locations between diffusers 30. Where necessary, drain holes 22 are designed to allow a certain percentage of water 22 (generally about ten percent) to drain away from atop underlayment 12. This drainage reduces salts accumulation that would otherwise occur from the natural evaporation and transpiration of water 20.

Referring now specifically to FIG. 2, diffuser 30 is shown in reduced scale in this exploded, perspective view. Diffusion conduit 16 is shown with at least one hole 17 therein by which water 20 is introduced into diffuser 30. Water 20 is diffused outwardly from hole 17 in a full 360° circle by the porous nature of diffusion layer 32. Diffusion layer 32 is sandwiched between underlayment 12 and overlayment 34 so that water 20 is forced outwardly in a full, 360°, horizontal direction rather than in a vertical direction. Upon reaching fringe 33 water 20 is no longer constrained by overlayment 34 and is thus readily able to percolate into and to be drawn by capillary action upwardly and outwardly into the overlying soil. Underlayment 12 prevents water 20 from being lost by any downward movement as would otherwise occur if underlayment 12 were absent.

Holes 17 are formed in diffusion conduit 16 in any preselected pattern and of any predetermined size. The particular pattern chosen is a function of various factors associated with the installation of subsurface irrigation apparatus 10. For example, in those installations on a sloped surface to subsoil 50, it may be preferable to orient each of holes 17 in an offset or staggered orientation relative to the next, succeeding hole 17 directly downslope so as to reduce any tendency for water 20 to create a flow channel from one hole 17 to the next hole 17 and so forth. Additionally, each of the succeeding holes 17 downslope can be selectively prepared with an opening that is incrementally smaller than the upslope hole in order to compensate for the downward orientation of the moisture plume generated by the upstream hole 17.

As an added feature to subsurface irrigation apparatus 10, valve 18 can be configured as a remotely operated valve electrically coupled to a controller 26 through a control line 29. Controller 26 is a conventional controller having the necessary programmable features such as times of operation of valve 18 as well as duration for the delivery of water 20 into supply conduit 14. Controller 26 can also be automated by the inclusion of a moisture sensor 24 electrically coupled to controller 26 by a sensor line 27. Electrical power is supplied to controller 26 by a power line 28. In this manner subsurface irrigation apparatus 10 can be selectively controlled to deliver precise, predetermined quantities of water 20 to sod 40 (FIGS. 3 and 4) at any time and under any preselected conditions.

Figure 3:
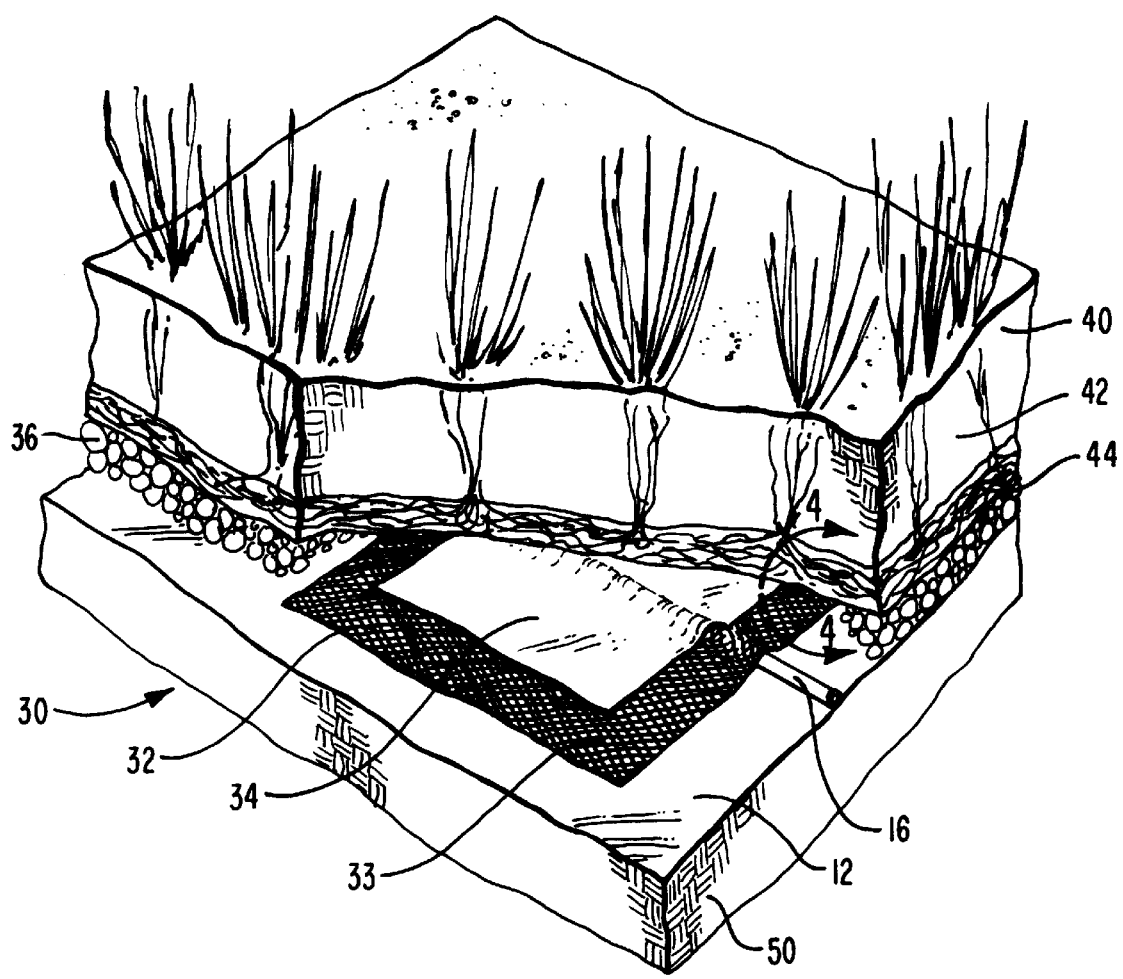
FIG. 3 is a perspective view of a water diffuser shown in the environment of a layer of sod.
Figure 4:
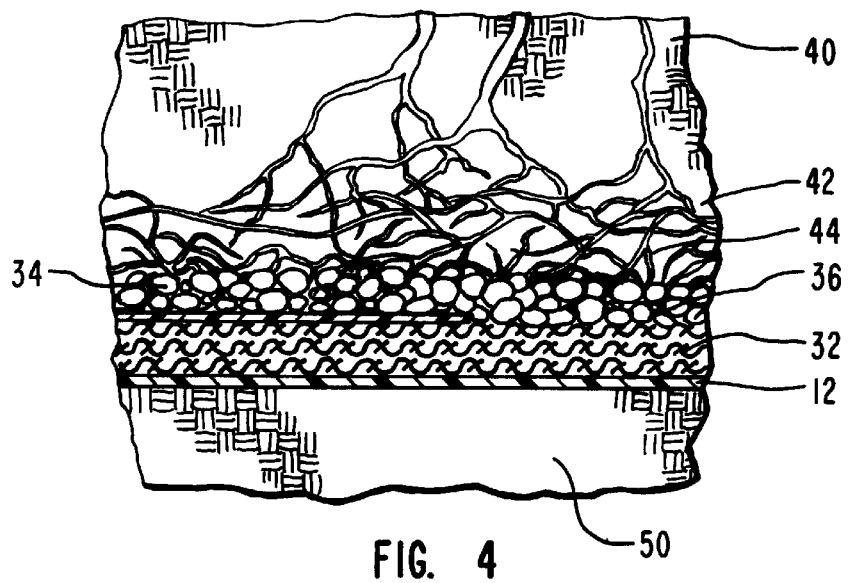
FIG. 4 is an enlarged, cross-sectional view of a fragmentary portion of FIG. 3, illustrating diffusion of water into the root zone of the overlying sod.

Referring now also to FIGS. 3 and 4, sod 40 is shown growing atop subsurface irrigation apparatus 10 placed atop a subsoil 50. Sod 40 includes a root zone 42, the lower portion of which is formed as a zone of densely matted roots 44. Densely matted roots 44 are created by the presence of subsurface irrigation apparatus 10, particularly by underlayment 12 which prevents the roots in root zone 42 from extending downwardly into the underlaying subsoil 50. The vertical dimension of the thickness of sod 40 can be any suitable thickness although I have found that an optimal thickness is generally within the range on the order of about 5 to 10 centimeters. However, for flower beds and the like a more suitable depth for subsurface irrigation apparatus 10 may be anywhere within the range on the order of about 10 to 20 centimeters deep. The depth at which one buries subsurface irrigation apparatus 10, is, therefore, a function of the type of plants to be watered thereby. However, the present configuration was designed as a subsurface watering system for a lawn, sod 40. As such, the resulting sod 40 will be particularly characterized by the absence of above ground sprinkling heads, hoses, etc. Further, subsurface irrigation apparatus 10 is ideally suited for the use of what is commonly referred to as "grey water," grey water being defined as the nontoilet waste water collected from basins, dishwashers, tubs, washing machines, and the like. The only adaptation necessary to adapt subsurface irrigation apparatus 10 to the use of such grey water as water 20 is the inclusion of a conventional filter system such as filter 21 which is installed in supply conduit 14 adjacent valve 18. Advantageously, since water 20 is delivered below the soil level there is minimal health hazard, odors, or the like, that would otherwise be encountered if one were to distribute grey water using a conventional, above ground sprinkling system.

Additional diffusion of water 20 into sod 40, if necessary, can be achieved by selectively including a layer of coarse sand or gravel shown herein as aggregate layer 36 atop underlayment 12 and diffuser 30. Aggregate layer 36 is particularly useful in those applications where sod 40 includes a particularly high percentage of clay.

The Method

The novel method of this invention involves obtaining a sheet of water resistent or otherwise waterproof material such as a plastic for use as underlayment 12. Underlayment 12 should be sufficiently robust to withstand the rigors encountered during fabrication, transportation, and installation of subsurface irrigation apparatus 10. I have found, for example, that a sheet of agricultural grade polypropylene plastic about 2 mils thick was adequate for this purpose. A sheet of underlayment having dimensions of about three meters wide and about 10 to 20 meters long is generally an acceptable size although any other preselected size configuration may be utilized. Supply conduit 14 is then mounted across one edge of underlayment 12. Distribution conduits 16a–16c are then affixed in a parallel relationship along the long axis of underlayment 12 and coupled to supply conduit 14 in fluid communication therewith. Holes 17 are formed in distribution conduits 16a–16c at preselected intervals along the length of distribution conduits 16a–16c either before or after distribution conduits have been mounted to underlayment 12. Each of holes 17 are then covered by a diffuser 30 which is prepared from a square of diffusion layer 32 and covered with an overlayment 34. Importantly, the dimensions of overlayment 34 are less than diffusion layer 32 in order to leave a fringe 33 exposed around the periphery of diffuser 30.

Subsurface irrigation apparatus is now ready for installation under sod 40. For an existing layer of sod 40, a longitudinal cut is made in sod 40 to a length generally corresponding to the length of subsurface irrigation apparatus 10. A series of lateral cuts are then made in the sod outwardly and perpendicularly from the longitudinal cut to a total distance incrementally greater than the width of subsurface irrigation apparatus 10. The distance between lateral cuts is sufficiently narrow to accommodate the installers being able to roll the sod into a roll that is rolled outwardly. This procedure results in a plot of subsoil 50 that is bare of sod 40 in an area incrementally larger than subsurface irrigation apparatus 10. Subsurface irrigation apparatus 10 is then laid over the top of sub soil 50 and sod 40 is then relaid over the top of subsurface irrigation apparatus 10. Sod 40 is easily and uniformly watered with water 20 by simply opening valve 18 to distribute water 10 to each of diffusers 30. Importantly, diffusion layer 32 directs water 20 outwardly into fringe 33 in a full 360° circle so as to uniformly distribute water 20 into fringe 33. Fringe 33 allows water 20 to percolate into sod 40 where it is readily absorbed therein.

Advantageously, since water 20 is distributed directly to root zone 42 of sod 40 there is minimal loss of water 20 through evaporation. Further, water 20 can be delivered to sod 40 even during hot, windy weather or other conditions when sprinkler irrigation is either prohibited or discouraged. Water 20 can also be delivered to sod 40 at any time and under any conditions, even during periods of activity on sod 40 such as golf, soccer, etc. This is made possible because subsurface irrigation apparatus 10 is specifically configured to deliver precise quantities of water to sod 40 so as to eliminate runoff, puddles, swampy areas and the like. Further, the inclusion of moisture sensor 22 and controller 26 allows the operator (not shown) to selectively adjust the operation of subsurface irrigation apparatus 10 to precisely control the delivery of water 20 to sod 40. For example, if sod 40 has been recently seeded, controller 26 can be programmed to deliver water 20 at such a rate as to keep the upper surface of sod 40 constantly moist for proper seed germination. After germination, controller 26 can be reprogrammed to reduce the rate of delivery of water 20 to sod 40 to thereby encourage the formation of root zone 42. Delivery of water 20 to the region of sod 40 below its surface also eliminates the problem of grass seed (not shown) being washed away.

The use of subsurface irrigation apparatus 10 for watering such areas as golf courses and the like means that watering need not be done at night since night watering is notorious for its exacerbation of fungi problems in sod 40. Further, the application of fertilizers, insecticides, selective herbicides, and the like, can be delivered directly into sod 40 at minimal exposure risk to persons playing golf, etc., on sod 40.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A subsurface irrigation apparatus comprising:

an underlayment, said underlayment being configured as a sheet of water resistant material;

a water supply conduit;

water distribution means mounted to said underlayment for distributing water over the surface of said underlayment, said water distribution means including at least one water distribution conduit coupled in fluid communication to said water supply conduit, said at least one water distribution conduit including a plurality of holes formed at spaced intervals in said at least one water distribution conduit;

a diffusion layer mounted across each of said holes in said at least one water distribution conduit, said diffusion layer comprising a first external periphery, said first external periphery having a first dimension and said overlayment comprises a second external periphery, said second external periphery having a second dimension, said first dimension being incrementally larger than said second dimension thereby creating a peripheral fringe of said diffusion layer extending beyond said second external periphery of said overlayment; and an overlayment mounted across said diffusion layer.

2. The subsurface irrigation apparatus defined in claim 1 wherein said subsurface irrigation apparatus includes a valve in said water supply conduit and a control means for controlling said valve.

3. The subsurface irrigation apparatus defined in claim 2 wherein said control means includes a controller and a moisture sensor for sensing moisture adjacent said sheet of water resistant material.

4. The subsurface irrigation apparatus defined in claim 2 wherein said underlayment includes a plurality of drain holes in said sheet of water resistant material.

5. The subsurface irrigation apparatus defined in claim 1 wherein said diffusion layer comprises a layer of fibrous material.

6. The subsurface irrigation apparatus defined in claim 5 wherein said fibrous material comprises a nonwoven fabric.

7. The subsurface irrigation apparatus defined in claim 6 wherein said nonwoven fabric comprises a fiberglass mat.

8. The subsurface irrigation apparatus defined in claim 1 wherein said diffusion layer at each of said holes in said at least one water distribution conduit is spaced from the adjacent diffusion layer.

9. The subsurface irrigation apparatus defined in claim 1 wherein said subsurface irrigation apparatus includes a layer of coarse sand spread across said subsurface irrigation, said layer of coarse sand aiding in the diffusion of water.

10. A subsurface irrigation apparatus comprising:

a water supply conduit operable to receive water from a supply of said water;

valve means in said water supply conduit for regulating flow of said water through said water supply conduit;

a plurality of water distribution conduits coupled in fluid communication to said water supply conduit, each of said water distribution conduits being spaced at preselected locations along said water supply conduit and in parallel relationship with each adjacent said water distribution conduit;

an underlayment beneath said water distribution conduits;

a plurality of holes in said water distribution conduits, said holes being formed in a spaced relationship to form a grid on said water distribution conduits; and a water diffuser on each of said holes, said water diffuser including a diffusion layer and an overlayment, said diffusion layer comprising a sheet of fibrous material, said diffusion layer having a first surface area and said overlayment having a second surface area, said first surface area being incrementally larger than said second surface area thereby providing a peripheral fringe of said diffusion layer around said overlayment.

11. The subsurface irrigation apparatus defined in claim 10 wherein said water supply conduit and said plurality of said water distribution conduits are mounted to said underlayment and said underlayment provides a support structure for said water supply conduit and said water distribution conduits.

12. The subsurface irrigation apparatus defined in claim 10 wherein said underlayment includes a plurality of drain holes at spaced locations in said underlayment.

13. The subsurface irrigation apparatus defined in claim 10 wherein said fibrous material comprises a nonwoven fabric.

14. The subsurface irrigation apparatus defined in claim 10 wherein said subsurface irrigation apparatus includes a controller for selectively operating said valve means.

15. The subsurface irrigation apparatus defined in claim 14 wherein said controller includes a moisture sensor for sensing a low moisture condition adjacent said underlayment.

16. A method for providing an irrigation water at a subsurface location comprising the steps of:

laying a sheet of underlayment at a predetermined location;

mounting a water supply conduit atop said underlayment;

coupling a plurality of water distribution conduits in fluid communication to said water supply conduit;

forming a plurality of holes at spaced locations in said water distribution conduits;

placing a water diffuser atop each of said holes;

laying a surface to be watered by said irrigation water atop said water diffuser; and watering said surface by directing said irrigation water through said water supply conduit and said water distribution conduits through said holes and said water diffuser into said surface, said watering step including diffusing said irrigation water into said surface by forming said diffuser with a layer of fibrous material atop said holes and covering said layer of fibrous material with an overlayment of water resistant material, said diffusing step including providing a peripheral fringe around said overlayment, said peripheral fringe acting as a diffuser for diffusing said irrigation water into said surface.

17. The method defined in claim 16 wherein said laying step includes forming a plurality of drain holes in said underlayment at preselected locations.

18. The method defined in claim 16 wherein said watering step includes interposing a valve in said water supply conduit and regulating said valve by coupling a controller to said valve.

19. The method defined in claim 18 herein said regulating step includes placing a moisture sensor in said surface and signaling the moisture condition of said surface to said controller with said moisture sensor.

* * * * *